United States Patent Office 3,092,486
Patented June 4, 1963

3,092,486
PROCESS FOR PREPARING AN AMMONIATING SOLUTION CONTAINING UREA AND FORMALDEHYDE
Charles E. Waters, Petersburg, and Charles H. Hibbitts, Hopewell, Va., assignors to Allied Chemical Corporation, New York, N.Y., a corporation of New York
No Drawing. Filed Jan. 26, 1960, Ser. No. 4,620
1 Claim. (Cl. 71—30)

This invention relates to an ammoniating solution containing urea and formaldehyde. It relates particularly to a solution suitable for use in the manufacture of mixed fertilizers containing water-insoluble nitrogen and to the process for its preparation.

It is desirable that any solution that is to be used for this purpose have a very low water content. This is not only because the contemplated mixed fertilizer manufacture in which it is to be used is essentially a dry-mixing operation, but also because the ammoniating solution may have to be stored and/or shipped before it is so used. The cost of each of these is materially affected by the volume and weight of the solution. A solution having a low water content is substantially cheaper to store or ship per effective ammoniating unit than a solution having a large volume of water. Nevertheless, problems have been encountered in attempts to prepare suitable solutions with low water content, because of the tendency thereof to form precipitates.

It is therefore an object of this invention to provide a clear, low water content ammoniating solution suitable for use in the preparation of fertilizers containing insoluble nitrogen, and suitable also for storage without forming precipitates.

It is a further object of this invention to provide a process by means of which a clear, low water content ammoniating solution, suitable for the above-noted purposes, can be prepared.

It has been found that these objects and other advantages incidental thereto can be obtained by first adding ammonia to an aqueous urea-formaldehyde concentrate containing urea and formaldehyde in the form of methylolureas, which concentrate is 80–90% solids calculated as urea and formaldehyde, has calculated urea:formaldehyde mol ratio about 1:4–1:5, and is substantially free of polymeric compounds and ring compounds. At least a 5% excess of ammonia is added over that theoretically required to convert the formaldehyde content of the concentrate to hexamethylenetetramine. Then there are added to the resulting solution ammonium nitrate and urea in any order, the urea being added in an amount sufficient to give a urea/formaldehyde mol ratio within the range of 1:1 to 2:1. Preferably a further amount of ammonia is now added, suitably under pressure. The final resulting ammoniating solution is a clear aqueous solution containing about 13%–15% of water. The temperature is maintained not above about 90° C. throughout the process.

In carrying out the process of this invention, a urea-formaldehyde concentrate commercially identified as UF Concentrate-85, containing about 25% urea, 60% formaldehyde and 15% water, is used as the starting material. This material is not a simple urea-formaldehyde mixture, but is one which has been prepared in accordance with the teachings of U.S. Patent 2,652,377 and contains a part of the formaldehyde in chemical combination with the urea in the form of a mixture of methylol ureas, such as mono-, di-, tri-, and tetramethylolurea. Free formaldehyde is present in amount to give a calculated urea:formaldehyde mol ratio in the concentrate of about 1:4–1:5. By a "calculated" mol ratio of urea:formaldehyde in the concentrate we mean the mol ratio calculated from the quantities of carbon and nitrogen present in the concentrate, regardless of whether the urea and formaldehyde therein are in free form or in a combined form. The concentrate, as shown by infrared absorption studies, is substantially free of polymeric compounds and ring compounds such as urons (i.e. tetrahydro-1,3,5,4 oxadiazin-4-ones). While it might be presumed that this concentrate could readily be mixed with ammonia, ammonium nitrate and urea to form a suitable ammoniating solution which could be used in the manufacture of mixed fertilizers containing water-insoluble nitrogen, it has been found that the use of the UF Concentrate-85 will lead to the formation of a gelatinous, undesired precipitate, unless the sequence of steps hereinabove outlined is strictly adhered to in the preparation of the ammoniating solution.

In accordance with this invention, the concentrate is first treated with ammonia to convert the formaldehyde therein into hexamethylenetetramine in accordance with the following equation:

$$6CH_2O + 4NH_3 \rightarrow (CH_2)_6N_4 + 6H_2O$$

Sufficient ammonia must be used to provide an excess, namely at least about 5% excess over that theoretically required to convert the formaldehyde content of the concentrate to hexamethylenetetramine. By so doing, an untimely reaction, at a later stage, between formaldehyde and urea is prevented. The ammonia added at this stage is limited only by the pressure the container can withstand. It is preferable, however, to work under atmospheric conditions at this stage in the process and therefore, a 100% excess is considered as acceptable, since it will not produce a sufficiently high vapor pressure to cause a substantial loss of ammonia by vaporization.

To this solution we then add ammonium nitrate, preferably in concentrated aqueous solution, such as about 90%–95% concentration by weight. Although solid ammonium nitrate might be used without deleterious effects, the aqueous solution is preferred since it is substantially cheaper than the solid material. It is desirable to introduce a substantial quantity of ammonium nitrate into the solution, at least about 25% by weight. It has been found that under normal conditions, 60% is an upper limit. Above this, the ammonium nitrate has a tendency to settle out of solution. This could cause considerable trouble. Accordingly, the preferred range lies between 50 and 55%. Sufficient urea is then added to give a urea to formaldehyde mol ratio lying within the range of 1:1 to 2:1. The so-obtained solution may then be further ammoniated, preferably under pressures ranging from about atmospheric to about 50 p.s.i.g. measured at about 70° C. A preferred pressure is about 30 p.s.i.g.

In carrying out a specific example of the process 2.7 parts by weight water and 13.3 parts by weight formaldehyde concentrate (UF Concentrate-85) were measured into a mixing tank equipped with an external pump which circulated the tank contents into a heat exchanger. The concentrate had the following analysis:

| | |
|---|---|
| Formaldehyde, percent | 60 |
| Urea, percent | 25 |
| Solids (urea and HCHO), percent | 85 |
| Formaldehyde:urea mol ratio | 4.8:1 |
| Color, APHA 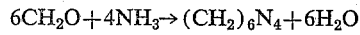 max__ | 10 |
| Turbidity, Hellige max__ | 10 |
| pH, at 25° C. (77° F.) approx__ | 8 |
| Viscosity at 25° C. (77° F.), cps max__ | 300 |
| Ash, percent max__ | 0.2 |
| Buffer capacity, ml. 0.5 N reagent, pH 2–9 _max__ | 15 |
| Free formic acid | None |
| Methanol, percent max__ | 0.3 |

The heat exchanger was connected interchangeably to steam and to water supplies, so that it could be used for either heating or cooling.

Liquid ammonia was injected into the circulating mixture until 5.3 parts had been added, amounting to about a 75% excess of ammonia over that theoretically required to convert the formaldehyde content of the concentrate to HMT (hexamethylenetetramine). During this period, the heat of reaction was removed by circulating cooling water into the heat exchanger in a quantity sufficient to maintain the temperature of the mix at 50° to 60° C. The solution was then heated to 65° to 70° C. by admitting steam to the heat exchanger. This temperature was maintained for about one-half hour, during which time any precipitate formed during the HMT reaction dissolved.

58.1 parts of a 92% ammonium nitrate solution was then added to the mix, subjected to cooling to hold the temperature at about 65° to 70° C. Solid crystal urea, 12.6 parts, was then added to the mixing tank while steam was used to supply the negative heat of solution of urea and to maintain the mix temperature within the range of 55° to 60° C. The resulting calculated mol raito of urea:formaldehyde in the solution, calculated to include combined as well as free urea and formaldehyde, was 1.00:1.

The balance of the ammonia about 8 parts by weight was added at a pressure of about 19 p.s.i.g. with cooling to hold the mix temperature around 70° C., whereupon steam was admitted to the heat exchanger to hold the final solution at a temperature of 65° to 70° C. for about 1 hour.

The final solution obtained as a result of this procedure had a low water content of about 14.2%, and was a clear yellow. It remained clear in storage for over six months. Its composition was the following:

|  | Percent |
| --- | --- |
| HMT | 6.2 |
| $NH_3$ | 10.3 |
| $NH_4NO_3$ | 53.4 |
| Urea | 15.9 |
| Water | 14.2 |

The ammoniating solution prepared in the manner described above is extremely well adapted for the manufacture of mixed fertilizers containing a relatively small amount of insoluble nitrogen. If this ammoniating solution is admixed with solid fertilizer ingredients, particularly those of an acidic nature such as superphosphate, the urea and the formaldehyde present in the ammoniating solution will further react to form the water-insoluble nitrogen products often referred to as ureaform. A suitable apparatus for such admixing step is a conventional rotary drum mixer equipped with sprayer through which our solution can be sprayed, without clogging of the spray holes. The resulting mixed fertilizer will be made up of a soluble portion in which the nitrogen is readily available to the plants, and a relatively insoluble poriton in which the nitrogen is only gradually released to the plants throughout the growing period.

Although certain preferred embodiments of the invention have been disclosed for purpose of illustration, it will be evident that various changes and modifications may be made therein without departing from the scope and spirit of the invention.

We claim:

A process for the preparation of a clear aqueous ammoniating solution containing ammonia, ammonium nitrate, urea and formaldehyde which comprises adding ammonia to an aqueous urea-formaldehyde concentrate containing urea and formaldehyde in the form of methylolureas, said concentrate being 80 to 90% total solids calculated as urea and formaldehyde, the calculated urea:formaldehyde mol ratio in said concentrate being about 1:4–1:5, and said concentrate being substantially free of polymeric compounds and ring compounds, said ammonia being added to at least a 5% excess but not exceeding a 100% excess over that theoretically required to convert the formaldehyde content of the concentrate to hexamethylene-tetramine; then adding to the resulting solution ammonium nitrate to provide 25 to 60 weight percent of ammonium nitrate in the final ammoniating solution; after addition of ammonium nitrate, adding urea in amount to bring the calculated urea:formaldehyde mol ratio within the range between 1:1 and 2:1, and thereupon adding a further quantity of ammonia to the solution while maintaining pressures between about atmospheric and about 50 p.s.i.g.; and including water in said solution in total amount in the final solution of about 13%–15%, the temperature throughout the process of producing the solution being maintained in the range between about 50° C. and about 70° C. whereby a clear aqueous ammoniating solution is produced.

References Cited in the file of this patent
UNITED STATES PATENTS

| 2,022,672 | Kniskern et al. | Dec. 3, 1935 |
| 2,255,026 | Keenan et al. | Sept. 2, 1941 |
| 2,255,027 | Keenan et al. | Sept. 2, 1941 |
| 2,279,200 | Keenan | Apr. 7, 1942 |
| 2,467,212 | Kvalnes | Apr. 12, 1949 |
| 2,592,809 | Kralovec et al. | Apr. 15, 1952 |
| 2,618,546 | Davenport | Nov. 18, 1952 |
| 2,766,283 | Darden | Oct. 9, 1956 |